Figure 1:
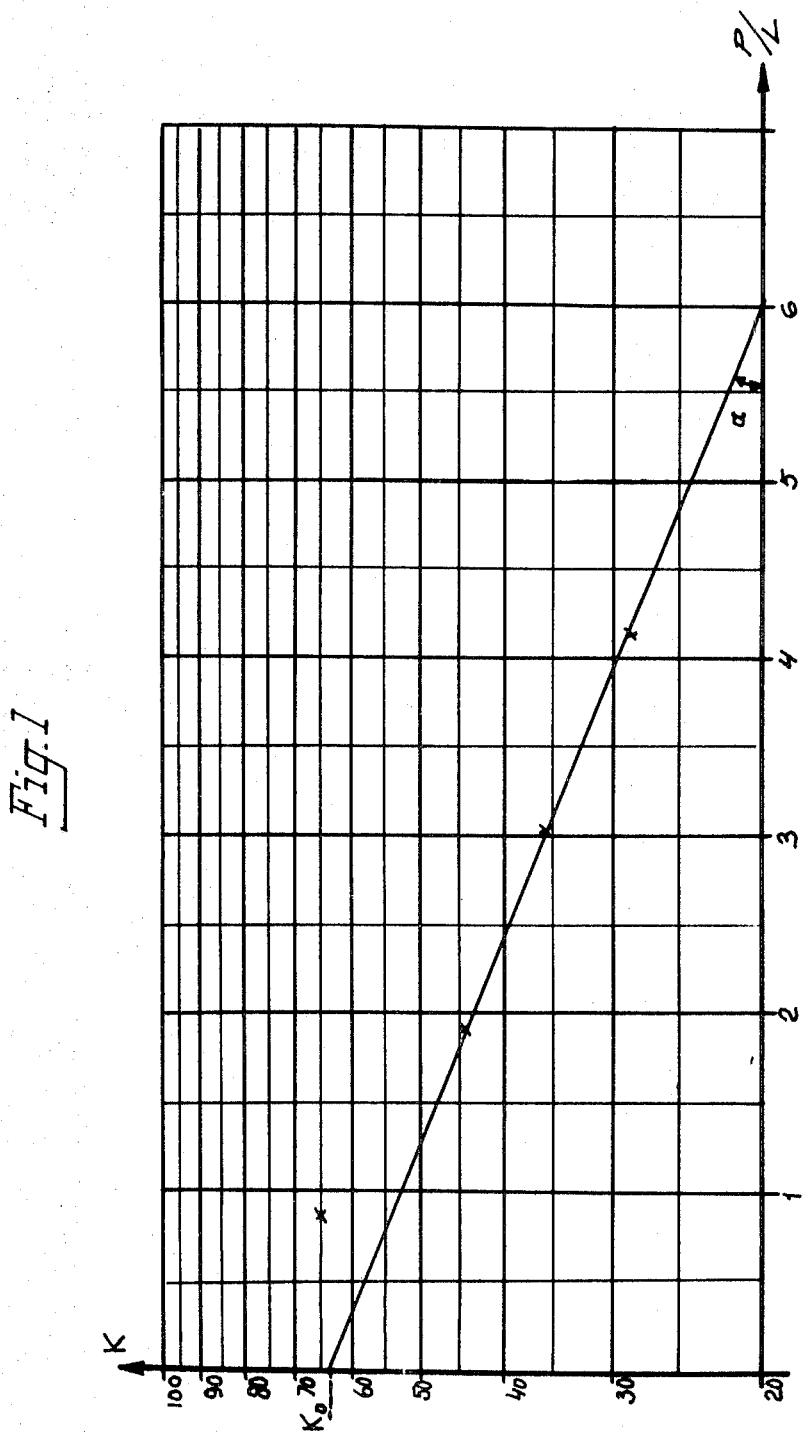

United States Patent

[11] 3,616,936

| [72] | Inventors | Ingemar Haldor Johansson;<br>Marius Klaus Joustra, Uppsala, both of Sweden |
|---|---|---|
| [21] | Appl. No. | 869,811 |
| [22] | Filed | Oct. 27, 1969 |
| [45] | Patented | Nov. 2, 1971 |
| [73] | Assignee | Pharmacia Fine Chemicals AB<br>Uppsalla, Sweden |
| [32] | Priority | Oct. 30, 1968 |
| [33] | | Sweden |
| [31] | | 14,667/68 |

[54] SEPARATION MEDIUM FOR GEL FILTRATION AND A METHOD FOR ITS PREPARATION
4 Claims, 3 Drawing Figs.

| [52] | U.S. Cl. | 210/504 |
|---|---|---|
| [51] | Int. Cl. | B01d 39/04 |
| [50] | Field of Search | 210/31 C, 504; 260/80.3 N |

[56] References Cited
UNITED STATES PATENTS

| 3,002,823 | 10/1961 | Flodin et al. | 210/31 C |
| 3,006,900 | 10/1961 | Fikentscher et al. | 260/80.3 N |
| 3,298,925 | 1/1967 | Mosbach | 210/31 C |
| 3,369,007 | 2/1968 | Flodin | 210/31 C |
| 3,536,614 | 10/1970 | Frisque et al. | 210/31 C |

*Primary Examiner*—Rueben Friedman
*Assistant Examiner*—R. W. Burks
*Attorney*—Fred C. Philpitt ABSTRACT: A separating medium for gel filtration in which grains of a water-insoluble copolymer of acrylamides or 1-vinyl-2-pyrrolidinone with N,N'-methylene-bis-acrylamide. The copolymer has an exclusion limit for globular proteins in the molecular weight range from 10,000 to 10,000,000 preferably 50,000–2,000,000. Said copolymer is reinforced by being copolymerized in the pores of a rigid, hydrophilic granular material comprising another copolymer of one or more acrylamides or 1-vinyl-2-pyrrolidinone with N,N'-methylene-bis-acrylamide wherein the bis-acrylamide content is 30 to 90 percent of the total weight of the two substances.

SEPARATION MEDIUM FOR GEL FILTRATION AND A METHOD FOR ITS PREPARATION

The present invention relates to a separation medium for gel filtration consisting of grains of a water-insoluble copolymer of an acrylamide of the formula

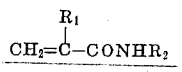

wherein $R_1$ is hydrogen, methyl or ethyl and $R_2$ is hydrogen or a straight or branched lower alkyl group optionally substituted by one or more hydroxy and/or oxo groups, the carbon chain of said alkyl group being optionally interrupted by one or more oxygen bridges, or of 1-vinyl-2-pyrrolidinone, with N,N'-methylene-bis-acrylamide, said separation medium having an exclusion limit for globular proteins, viruses or the like in the molecular weight range of from 10,000 to 10,000,000, preferably from 50,000 to 2,000,000.

A separation medium of this type is known to the art (see the U.S. Pat. specification No. 3,369,007). The medium can be used technically if it has an exclusion limit up to 10,000 to 50,000. Difficulties will arise above this limit, insofar as the gel grains are too easily deformed. This is reflected in the poor flow properties of the grains when used in the form of a bed. This in turn is a result of the fact that owing to the deformability of the grains they are pressed together as a result of the drop in pressure over the bed, thereby increasing the resistance to flow. This characteristic restricts the use of the separation medium in pure technical terms, and with regard to separation media which can be used technically disadvantages are manifested in the impaired flow.

It has now been discovered that the aforementioned disadvantage can be circumvented or essentially reduced if the grains in the described separation medium are reinforced with a stiff, hydrophilic macroporous material.

In accordance with the invention, special advantages are obtained if the separation medium is imparted an exclusion limit for globular proteins, viruses or the like in the molecular weight range of from approximately 50,000 to approximately 2,000,000.

Further, in accordance with the invention the stiff, hydrophilic macroporous material may be grains of a copolymer of an acrylamide of the formula

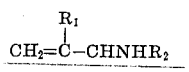

wherein $R_1$ is hydrogen or methyl or ethyl and $R_2$ is hydrogen or a straight or branched lower alkyl group optionally substituted by one or more hydroxy and/or oxo groups, the carbon chain of the alkyl group optionally being interrupted by one or more oxygen bridges, or of 1-vinyl-2-pyrrolidinone, with N,N'-methylene-bis-acrylamide, the polymer being obtained from an aqueous solution of the two substances, and wherein the content of N,N'-methylene-bis-acrylamide in the copolymer lies between 30 and 90 percent by weight based on the weight of the whole copolymer. Separation media built up in accordance with this embodiment have shown slight denaturalization and adsorbing effect on proteins, since both the reinforced portion and the separating portion of the separation media are of the same hydrophilic nature. Additionally, the bonding between the reinforced portion and the separating portion is extremely satisfactory, owing to the chemical similarity.

Rigid, hydrophilic, macroporous materials of the type used for reinforcing the medium in accordance with the present invention are previously known; for instance the defined copolymer is found described in U.S. Pat. application Ser. No. 756,509. According to the patent specification, however, the macroporous granular material is itself used as a separation medium. It can be used for separating substance mixtures of very high molecular weight, e.g. virus mixtures. It is not possible to perceive from the said patent that the material can be used as reinforcing material or a supporting substance in the known separation media of significantly lower exclusion limit. The present invention is thus concerned with a novel use of the rigid macroporous materials.

The invention also relates to a method for the preparation of the aforementioned separation medium. To these ends, it is possible in accordance with the invention to copolymerize in the pores of a rigid, hydrophilic macroporous granular material an acrylamide of the formula

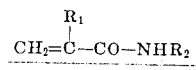

wherein $R_1$ and $R_2$ each have the above significance, with N,N'-methylene-bis-acrylamide in aqueous solution, the content of the two monomers in the aqueous solution and the molar ratio between the monomers being so selected that the resulting copolymer is insoluble in water and obtains an exclusion limit for globular proteins, viruses and the like within the range of from 10,000 to 10,000,000, preferably from 50,000 to 2,000,000.

The content of polymerizable compounds in the aqueous solution must be adjusted to a lower value than is the case when nonreinforced separating media are prepared (see the aforementioned U.S. Pat. specification), since in the latter instance there is nothing to impede the medium from swelling to equilibrium after copolymerization, whereas in the present instance the medium is not able to swell to equilibrium since it is enclosed in the reinforcing material. Suitable contents of polymerizable compounds lie essentially within the range of from 1 to 20 g./dl., preferably from 2 to 10 g./dl. The content of N,N'-methylene-bis-acrylamide is adjusted to a value which exceeds that necessary to reach the so-called gel point. This can be studied in model tests in which the reinforcing material is not present in which case it is easy to observe when the gel point is reached. The content of N,N'-methylene-bis-acrylamide in relation to the total quantity of polymerizable compounds normally varies substantially between 1 and 10 percent. Examples of suitable acrylamides capable of being contained both in the separating part and the reinforcing part may be compounds of the above formula, in which the radical $R_2$ is methyl, hydroxymethyl, ethyl, isopropyl, but more complicated radicals are also contemplated, such as 1,1-dimethyl-3-oxo-butyl.

There are two properties which determine the suitability of the separating media for their respective purpose, viz for the first, the rigidity and for the second, the exclusion limit. The rigidity can be determined by subjecting the separating medium to flow tests. To these ends, the medium is slurried in water and packed into a bed having a diameter of 5 cm. and a height of 10 cm. A gradually increasing hydrostatic pressure drop ($p$) is applied over the bed, whereupon the linear flow ($U$) and the bed height ($L$) is measured for each value of $p$. The permeability of the bed is calculated by applying the expression $K = L \cdot (U/p)$. If $K$ is plotted on a logarithmic scale in a graph against the value of $p/$i $L$ a straight line is obtained. The point at which the line intersects the ordinate gives the value of $K_o$. If the slope angle of the line is designated $\alpha$ the maximum flow ($U$) ($U_{max}$) is then obtained for the gel bed from the equation $$U_{max} = \frac{K_o}{\ln 10 \cdot tg\alpha \cdot c}$$

A flow measurement was made for each of the products prepared in accordance with the following examples. After each example is given the value on $U_{max}$ applicable for pearls having an average diameter of 150 micrometers in wet condition.

The appended drawing, FIG. 1, illustrates how $U_{max}$ is determined. The graph has been drawn for one of the products prepared in accordance with the invention. In the present instance the following values are obtained on the magnitudes forming the above relationships: $tg\alpha=0.08$.

$$K_o = 64$$

and hence $$U_{max} = \frac{64}{ln 10 \cdot e \cdot 0.08} = 128 \text{ ml./cm.}^2 \cdot \text{hour}$$

Figure 2:
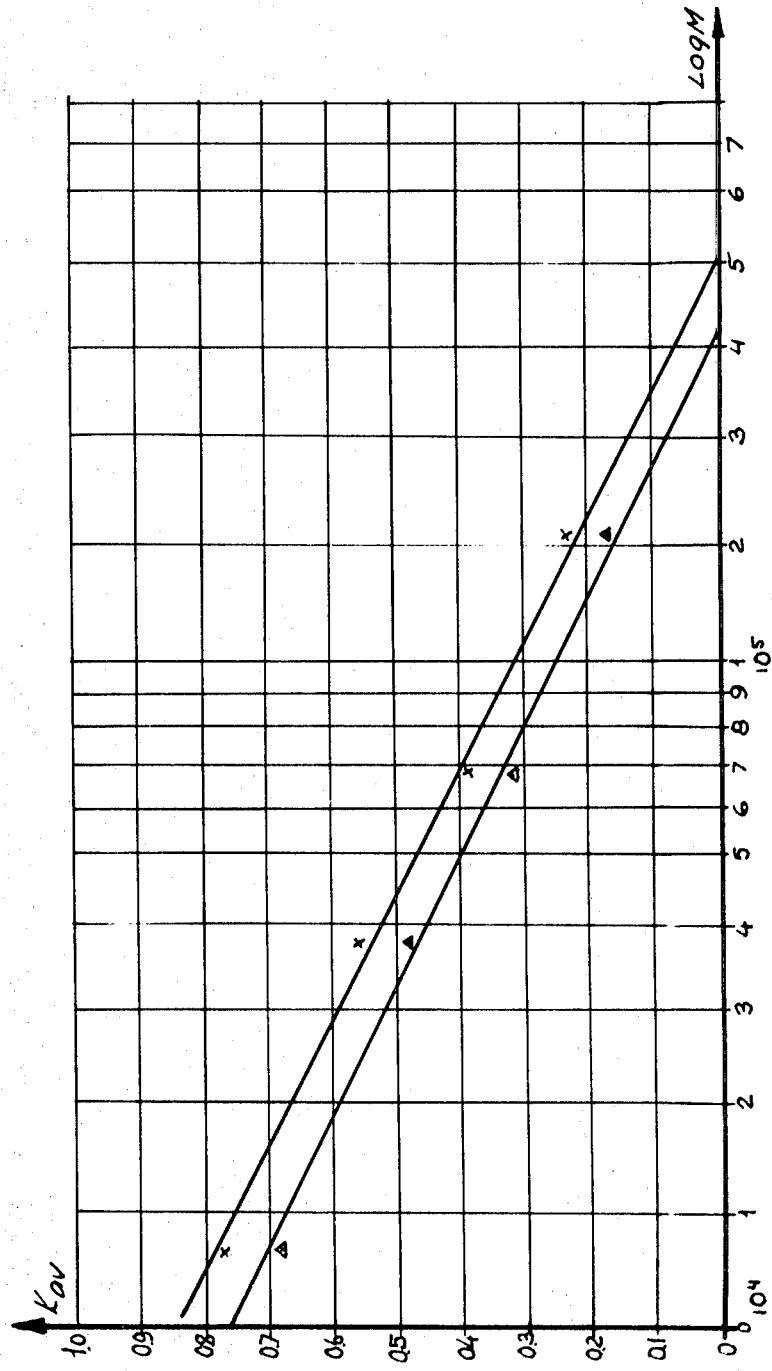

The exclusion limit was also used to characterize the products. By the term "exclusion limit" is meant the upper limit of the molecular weight range within which a separation according to molecular size is obtained. The exclusion limit is determined by a method in which some proteins of different molecular weights are chromatographed through a bed of the separating medium and that the $K_{av}$ values of said proteins are calculated. $K_{av}$ is a parameter which gives the penetration ability of the chromatographed substance in the separating medium and is defined as $$K_{av} = \frac{V_e - V_o}{V_t - V_o}$$

wherein
$V_e$ = elution volume
$V_o$ = void volume
$V_t$ = bed volume $K_{av}$ 32 0 means that the chromatographed substance is completely excluded from the pores of the separating medium. The measured $K_{av}$ values for the different proteins are then plotted in a graph against the logarithm of the molecular weight. The points in the graph are connected by a straight line and the approximate exclusion limit is obtained at the point where the line intersects the abscissa. The method is found illustrated for separating media according to examples 6 and 7 on the appended drawing, FIG. 2.

In the exemplary test the dimensions of the column used were 2.5×42 cm. The eluting agent was 0.1 M tris, 0.5 M NaCl, pH 8 and the rate of elution was 8.3 ml./cm.². hour.

The following were used as test substances:

| | |
|---|---|
| cytochrome c | M = 13,000 |
| β-lactoglobulin | M = 38,000 |
| albumin | M = 69,000 |
| γ-globulin | M = 156,000 |

Figure 3:
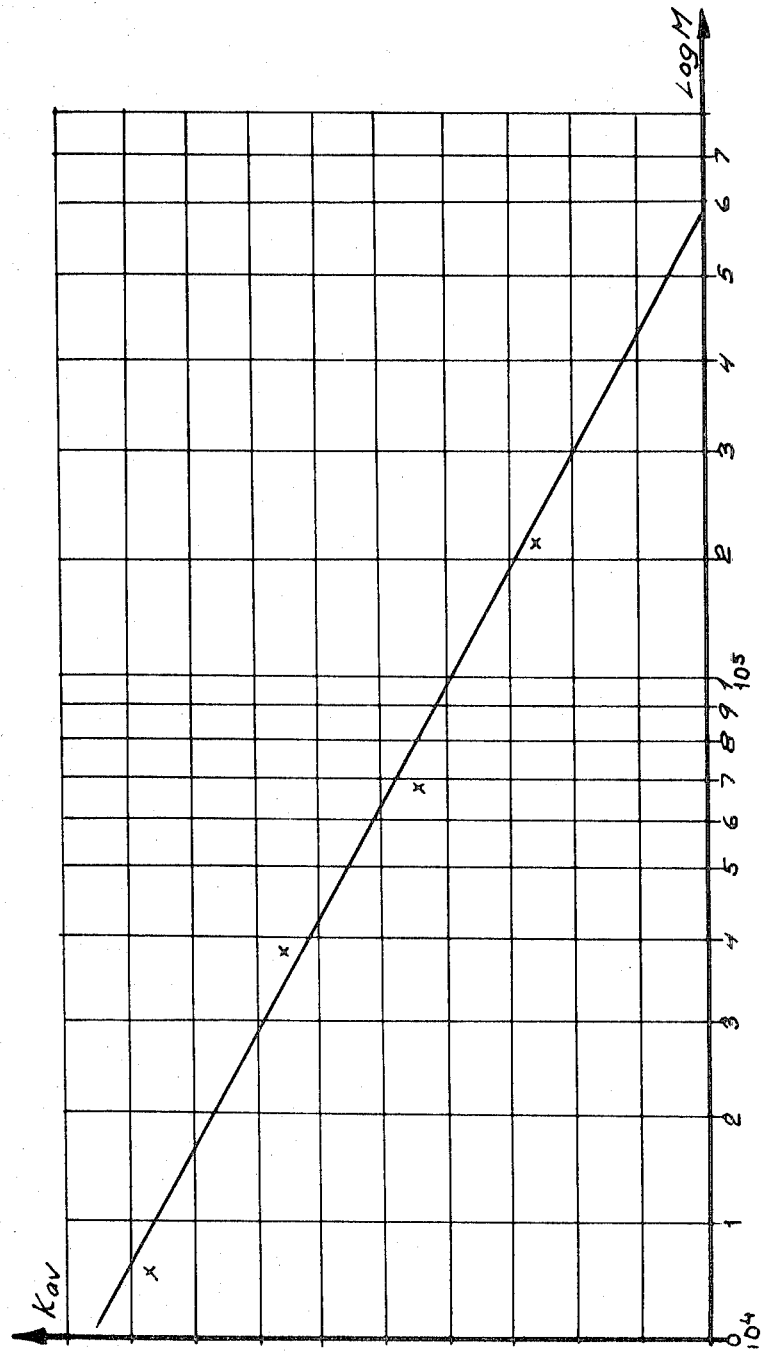

In connection with the aforedescribed methods, the maximum flow and the approximative exclusion limit were also determined for a polyacrylamide gel according to the prior art (Bio Gel-P 300) with pearls of an average diameter of 150 μ. In this way a maximum flow of 2.5 ml./cm.²·h was determined and an approximative exclusion limit of 600,000 according to the method illustrated in FIG. 3.

A comparison of these figures with those shown in the examples clearly shows the great advantage with gel in accordance with the present invention.

The maximum flow through the gel bed is approximately inversely proportional to the height of the bed. Thus, if it is desired to fractionate serum proteins on a larger scale using a gel bed of, for example, 50×200 cm. it would not be possible when using the gel known to the art (Bio Gel-P 300) to obtain a higher flow than 0.1 ml./cm.²/h, while when using gels prepared in accordance with examples 1–7 it is possible to obtain fully usable flows from 6 to 11 ml./cm.²/h.

The invention will now be described with reference to a number of examples.

EXAMPLE 1

A Copolymer of Methacrylamide with N,N'-Methylene-Bis-Acrylamide

The synthesis is carried out in two stages. In the first stage a rigid network is produced, which serves as a reinforcement, and in the second stage the reinforcement is filled with softer gel.

I. 20 g. of fine grain chalk covered with calcium stearate and 5 g. of an emulsifier (dodecyl-phenoxypoly-(ethylenoxy)-ethanol) were slurried in 200 ml. of toluene in a reaction vessel placed in a water bath, the temperature of which was maintained at 50° C. 5.5 g. of methacrylamide and 4.5 g. of N,N'-methylene-bis-acrylamide were dissolved in 100 ml. of water at 50° C. 1.2 g. of ammonium persulphate were added to the monomer solution as an initiator and the solution together with the initiator added thereto was introduced immediately into the reaction vessel. The two-phase mixture was then strongly stirred. After 15 minutes nitrogen gas was blown through the mixture to expel oxygen from the reaction vessel. After 4 hours, stirring was interrupted and the formed pearls were washed with diluted acetic acid, toluene and water.

II. The pearls were then slurried with water to obtain a pearl suspension having a volume of 300 ml. 14.84 g. of acrylamide and 0.15 g. of N,N'-methylene-bis-acrylamide were dissolved in the suspension whilst stirring. 900 ml. of toluene and 27 g. of a surface-active agent (tridecyl-poly(ethylenoxy)-ethanol) were charged to a reaction vessel equipped in the same way as described above. 0.9 g. of ammonium persulphate was dissolved in the pearl suspension. Excess of liquid was then immediately removed by filtration. The pearls soaked with an aqueous solution of monomer and initiator in the manner aforedescribed were then charged to the reaction vessel whilst subjected to strong agitation and while nitrogen gas was introduced thereto. The reaction temperature was 50° C. Stirring was interrupted after 4 hours and the reaction product washed with acetone and water. The product was allowed to settle in a measuring glass, whereupon the yield was measured as 180 ml.

Exclusion limit approximately 400,000. Flow maximum ($U_{max}$) 240 ml./cm.²·hour.

EXAMPLE 2

Copolymer of Methacrylamide with N,N'-Methylene-Bis-Acrylamide

The method was effected in a manner similar to that described in example 1.

In stage I 5.5 g. of methacrylamide and 4.5 g. of N,N'-methylene-bis-acrylamide were used, and in stage II 10.4 g. of acrylamide and 0.105 g. of N.N'-methylene-bis-acrylamide were used.

The yield was 180 ml.

Exclusion limit approximately 800,000.

Flow maximum ($U_{max}$) 240 ml./cm.²·hour.

EXAMPLE 3

Copolymer of Methacrylamide with N,N'-Methylene-Bis Acrylamide

The method was effected in a manner similar to that described in example 1.

In stage I were used 5.5 g. of methacrylamide and 4.5 g. of N,N'-methylene-bis-acrylamide, while in stage II were used 8.9 g. of acrylamide and 0.09 g. of N,N'-methylene-bis-acrylamide.

The yield was 185 ml.

The exclusion limit approximately 5,000,000.

The flow maximum ($U_{max}$) 240 ml./cm.²·hour.

EXAMPLE 4

Copolymer of N-(Hydroxymethyl)Acrylamidde with N,N'-Methylene-Bis-Acrylamide

In stage I were used 4 g. of N-(Hydroxymethyl)Acrylamide and 6 g. of N,N'-methylene-bis-acrylamide and in stage II were used 13.36 g. of acrylamide and 0.135 g. of N,N'-methylene-bis-acrylamide.

The yield was 170 ml.
The exclusion limit approximately 300,000.
The flow maximum ($U_{max}$) 270 ml./cm.$^2$·hour.

EXAMPLE 5

Copolymer of Acrylamide with N,N'-Methylene-Bis-Acrylamide

The method was effected in the same manner as that described in example 1.

In stage I were used 2.5 g. of acrylamide and 7.5 g. of N,N'-methylene-bis-acrylamide and in stage II were used 14.85 g. of acrylamide and 0.15 g. of N,N'-methylene-bis-acrylamide.

The yield was 190 ml.
The exclusion limit approximately 500,000.
The flow maximum ($U_{max}$) 180 ml./cm.$^2$·hour.

EXAMPLE 6

Copolymer of 1-vinyl-2-pyrrolidinone with N,N'methylene-bis-acrylamide

The method was effected in the same manner as that described in example 1.

In stage I were used 5 ml. of 1-vinyl-2-pyrrolidinone and 5 g. of N,N'-methylene-bis-acrylamide and 1 g. of dodecylphenoxypoly(ethylenoxy)ethanol and heptane instead of toluene. In stage II were used 14.85 g. of acrylamide and 0.15 g. of N,N'-methylene-bis-acrylamide.

The yield was 180 ml.
The exclusion limit approximately 300,000.
The flow maximum ($U_{max}$) 133 ml./cm.$^2$·hour.

EXAMPLE 7.

Copolymer of Methacrylamide with N,N'-Methylene-Bis-Acrylamide

The method was effected in the same manner as that described in example 1.

In stage I were used 2.5 g. of methacrylamide and 7.5 g. of N,N'-methylene-bis-acrylamide and in stage II were used 14.85 g. of acrylamide and 0.15 g. of N,N'-methylene-bis-acrylamide.

The yield was 170 ml.
The exclusion limit approximately 400,000.
The flow maximum ($U_{max}$) 180 ml./cm.$^2$·hour.

What we claim is:

1. A separating medium for gel filtration, consisting of grains of a water-insoluble copolymer of one or more acrylamides of the formula

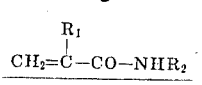

wherein $R_1$ is hydrogen or methyl or ethyl, and $R_2$ is hydrogen or a straight or branched lower alkyl group optionally substituted by one or more hydroxy and/or oxo groups, the carbon chain of which being optionally interrupted by one or more oxygen bridges, or of 1-vinyl-2-pyrrolidinone with N,N'-methylene-bis-acrylamide, said copolymer being obtained from an aqueous solution of the two substances, said medium having an exclusion limit for globular proteins, viruses and the like in the molecular weight range of from 10,000 to 10,000,000, characterized in that the grains are reinforced with a rigid, hydrophilic, macroporous material.

2. A separating medium as claimed in claim 1, wherein the copolymer has an exclusion limit for globular proteins, viruses, or the like in the molecular range of from 50,000 to 2,000,000.

3. The separating medium as claimed in claim 1, wherein the rigid, hydrophilic, macroporous material are grains of a copolymer of one or more acrylamides of the formula

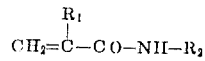

in which $R_1$ and $R_2$ each have the significance given in claim 1, which copolymer is obtained from an aqueous solution of the two substances, the content of N,N'-methylene-bis-acrylamide being between 30 and 90 percent by weight of the total weight of the two substances.

4. A method of preparing the separating medium according to claim 1, which comprises copolymerizing in the pores of a rigid, hydrophilic, macroporous, granular material one or msre acrylamides of the formula

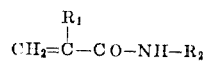

in which $R_1$ and $R_2$ each have the above significance, with N,N'-methylene-bis-acrylamide in aqueous solution, the content of the two monomers in the aqueous solution and the molar ratio between the monomers being so selected that the resulting copolymer is insoluble in water and obtains an exclusion limit for globular proteins, viruses or the like in the molecular weight range of from 10,000 to 10,000,000 preferably from 50,000 to 2,000,000.